(12) United States Patent
Heo et al.

(10) Patent No.: US 12,727,723 B2
(45) Date of Patent: Sep. 8, 2026

(54) CLEANING ROBOT AND METHOD OF CONTROLLING SAME

(71) Applicant: SAMSUNG ELECTRONICS CO., LTD., Suwon-si (KR)

(72) Inventors: Joonyoung Heo, Suwon-si (KR); Minjin Song, Suwon-si (KR); Jinhwi Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/808,519

(22) Filed: Aug. 19, 2024

(65) Prior Publication Data

US 2025/0064279 A1 Feb. 27, 2025

Related U.S. Application Data

(63) Continuation of application No. PCT/KR2024/010215, filed on Jul. 16, 2024.

(30) Foreign Application Priority Data

Aug. 22, 2023 (KR) ........................ 10-2023-0109907

(51) Int. Cl.
*A47L 9/00* (2006.01)
*A47L 9/28* (2006.01)
(Continued)

(52) U.S. Cl.
CPC ............. *A47L 9/009* (2013.01); *A47L 9/2826* (2013.01); *A47L 9/2852* (2013.01); *G06V 10/12* (2022.01); *G06V 20/58* (2022.01); *A47L 2201/04* (2013.01)

(58) Field of Classification Search
CPC ................ A47L 9/00; A47L 9/28; G05D 1/02
See application file for complete search history.

(56) References Cited

U.S. PATENT DOCUMENTS 9,436,186 B2 * 9/2016 Oh .......................... G05B 15/00
9,844,876 B2 * 12/2017 Chung ................... B25J 9/1664
(Continued)

FOREIGN PATENT DOCUMENTS

CN 115599513 A 1/2023
EP 4 280 061 A1 11/2023
(Continued)

OTHER PUBLICATIONS

International Search Report (PCT/ISA/210) and Written Opinion (PCT/ISA/237) issued Oct. 29, 2024 by the International Searching authority in International Patent Application No. PCT/KR2024/010215.

(Continued)

*Primary Examiner* — Michael D Jennings
(74) *Attorney, Agent, or Firm* — Sughrue Mion, PLLC

(57) ABSTRACT

Provided is a cleaning robot and a method of controlling same, the cleaning robot including: at least one sensor; at least one camera; a driver; at least one memory storing at least one instruction; and at least one processor connected with the at least one sensor, the at least one camera, the driver, and the at least one memory and configured to execute the at least one instruction, wherein the at least one instruction, when executed by the at least one processor, causes the cleaning robot to: identify a surrounding environment based on a video captured using the at least one camera, wherein the video is captured while the driver causes the cleaning robot to move, and adjust, based on the surrounding environment, a processing priority order of data obtained from the video.

13 Claims, 13 Drawing Sheets

(51) Int. Cl.

| | |
|---|---|
| ***G06V 10/12*** | (2022.01) |
| ***G06V 20/58*** | (2022.01) |

(56) References Cited

U.S. PATENT DOCUMENTS

| | | | | |
|---|---|---|---|---|
| 9,946,263 | B2 * | 4/2018 | Lindhé | G05D 1/0248 |
| 10,963,300 | B2 | 3/2021 | Champigny | |
| 2014/0324271 | A1 * | 10/2014 | Oh | G05D 1/0251<br>701/28 |
| 2016/0313741 | A1 * | 10/2016 | Lindhe | G05D 1/0248 |
| 2020/0110636 | A1 | 4/2020 | Obara et al. | |
| 2024/0328815 | A1 | 10/2024 | Phillips | |

FOREIGN PATENT DOCUMENTS

| | | | |
|---|---|---|---|
| JP | 2017-502371 | A | 1/2017 |
| JP | 2022-035765 | A | 3/2022 |
| JP | 2022-103968 | A | 7/2022 |
| JP | 2022-170340 | A | 11/2022 |
| KR | 10-1568204 | B1 | 11/2015 |
| KR | 10-2020-0027068 | A | 3/2020 |
| KR | 10-2021-0057184 | A | 5/2021 |
| KR | 10-2331563 | B1 | 11/2021 |
| KR | 10-2023-0012855 | A | 1/2023 |
| KR | 10-2531352 | B1 | 5/2023 |
| WO | 2024/105815 | A1 | 5/2024 |

OTHER PUBLICATIONS

Communication dated Jun. 3, 2026 issued by the European Patent Office in European Patent Application No. 24856656.4.

* cited by examiner

CLEANING ROBOT AND METHOD OF CONTROLLING SAME

CROSS-REFERENCE TO RELATED APPLICATIONS

This application is a by-pass continuation of International Application No. PCT/KR2024/010215, filed on Jul. 16, 2024, which is based on and claims priority to Korean Patent Application No. 10-2023-0109907, filed in the Korean Intellectual Property Office on Aug. 22, 2023, the disclosures of which are incorporated herein by reference in their entireties.

BACKGROUND

1. Field

The disclosure relates to a cleaning robot and a method of controlling same, and more particularly to a cleaning robot which is able to adjust a processing priority order of internal data of the cleaning robot according to a surrounding environment and a method of controlling same.

2. Description of Related Art

An autonomous driving robot is a device that performs a predetermined task while driving a random area without a user operation. Specifically, recently, cleaning robots are being widely used within homes. A cleaning robot is a device which cleans surfaces driving a cleaning area without user operation.

Specifically, the cleaning robot may be used in removing dust or cleaning surfaces in homes. Here, dust may mean soil, dust, specks, powders, fragments, other dust particles, and the like which are collectable by a vacuum cleaner or an automatic or semi-automatic cleaning device.

Specifically, the cleaning robot may detect many objects or obstacles in a process of cleaning a room. As part of the detection process, the cleaning robot may identify stationary obstacles such as plants, toys, and dotted lines, and perform a cleaning operation while avoiding the identified obstacles.

SUMMARY

According to an aspect of the disclosure, a cleaning robot includes: at least one sensor; at least one camera; a driver; at least one memory storing at least one instruction; and at least one processor connected with the at least one sensor, the at least one camera, the driver, and the at least one memory and configured to execute the at least one instruction, wherein the at least one instruction, when executed by the at least one processor, causes the cleaning robot to: identify a surrounding environment based on a video captured using the at least one camera, wherein the video is captured while the driver causes the cleaning robot to move, and adjust, based on the surrounding environment, a processing priority order of data obtained from the video.

The at least one instruction, when executed by the at least one processor, may further causes the cleaning robot to: identify whether a driving route of the cleaning robot is a safe route or a caution route by identifying whether an obstacle is present within a preset distance of the cleaning robot.

The at least one instruction, when executed by the at least one processor, may further causes the cleaning robot to:

based on the driving route being identified as the caution route, raise a processing priority order for video processing of the video.

The at least one instruction, when executed by the at least one processor, may further causes the cleaning robot to: based on the driving route being identified as the safe route, perform video processing by adjusting at least one from among a resolution and a frame rate of the video.

The at least one instruction, when executed by the at least one processor, may further causes the cleaning robot to: based on the driving route being identified as the safe route, stop an operation of the at least one sensor.

The at least one instruction, when executed by the at least one processor, may further causes the cleaning robot to: based on the driving route being identified as the safe route, cause a kernel of the cleaning robot not to receive an output signal of the at least one sensor.

The at least one sensor may include one from among an infrared (IR) sensor or a fall detection sensor.

The at least one processor may include a central processing unit (CPU) and a graphics processing unit (GPU), and the at least one instruction, when executed by the at least one processor, may further causes the cleaning robot to: perform video processing of the video by selectively using the CPU or the GPU based on an operating state of the CPU and an operating state of the GPU.

The at least one instruction, when executed by the at least one processor, may further causes the cleaning robot to: identify the CPU or the GPU to perform the video processing based on a processing time of the video processing in the GPU, a processing time of the video processing in the CPU, and an estimated time of completion of a current task in the GPU.

The at least one instruction, when executed by the at least one processor, may further causes the cleaning robot to: based on an abnormality being identified from among the at least one camera, the at least one sensor, and the at least one processor, control the driver to return the cleaning robot to a charging station.

The at least one camera may include a stereo camera and a RGB camera, and the at least one instruction, when executed by the at least one processor, may further causes the cleaning robot to: based on an abnormality being identified in the stereo camera or the RGB camera, capture the video using a normally operating camera from among the at least one camera and provide the video to an application configured to use an input received from the camera, among the stereo camera and the RGB camera, identified with the abnormality.

According to an aspect of the disclosure, a method of controlling a cleaning robot includes: performing a cleaning operation; identifying a surrounding environment based on a video captured using at least one camera of the cleaning robot, wherein the video is captured while the cleaning robot moves; and adjusting, based on the surrounding environment, a processing priority order of data obtained from the video.

The identifying the surrounding environment may include: identifying whether a driving route of the cleaning robot is a safe route or a caution route by identifying whether an obstacle is present within a preset distance of the cleaning robot.

The adjusting the processing priority order may include: based on the driving route being identified as the caution route, raising the priority order of video processing of the video.

The adjusting the processing priority order may include: based on the driving route being identified as the safe route, adjusting at least one from among a resolution and a frame rate of the video.

The adjusting the processing priority order may include: based on the driving route being identified as the safe route, stopping an operation of at least one sensor of the cleaning robot.

According to an aspect of the disclosure, a non-transitory computer readable medium having instructions stored therein, which when executed by at least one processor cause the at least one processor to execute a method of controlling a cleaning robot, wherein the method includes: identifying a surrounding environment based on a video captured using at least one camera of the cleaning robot, wherein the video is captured while the cleaning robot moves; and adjusting, based on the surrounding environment, a processing priority order of data obtained from the video.

With regard to the method executed by the at least one processor based on the instructions stored in the non-transitory computer readable medium, the identifying the surrounding environment may include: identifying whether a driving route of the cleaning robot is a safe route or a caution route by identifying whether an obstacle is present within a preset distance of the cleaning robot.

With regard to the method executed by the at least one processor based on the instructions stored in the non-transitory computer readable medium, the adjusting the processing priority order may include: based on the driving route being identified as the caution route, raising a processing priority order of video processing of the video.

With regard to the method executed by the at least one processor based on the instructions stored in the non-transitory computer readable medium, the adjusting the processing priority order may include: based on the driving route being identified as the safe route, adjusting at least one from among a resolution and a frame rate of the video.

BRIEF DESCRIPTION OF THE DRAWINGS

The above and other aspects and features of certain embodiments of the present disclosure will be more apparent from the following description taken in conjunction with the accompanying drawings, in which.

DETAILED DESCRIPTION

Figure 1:
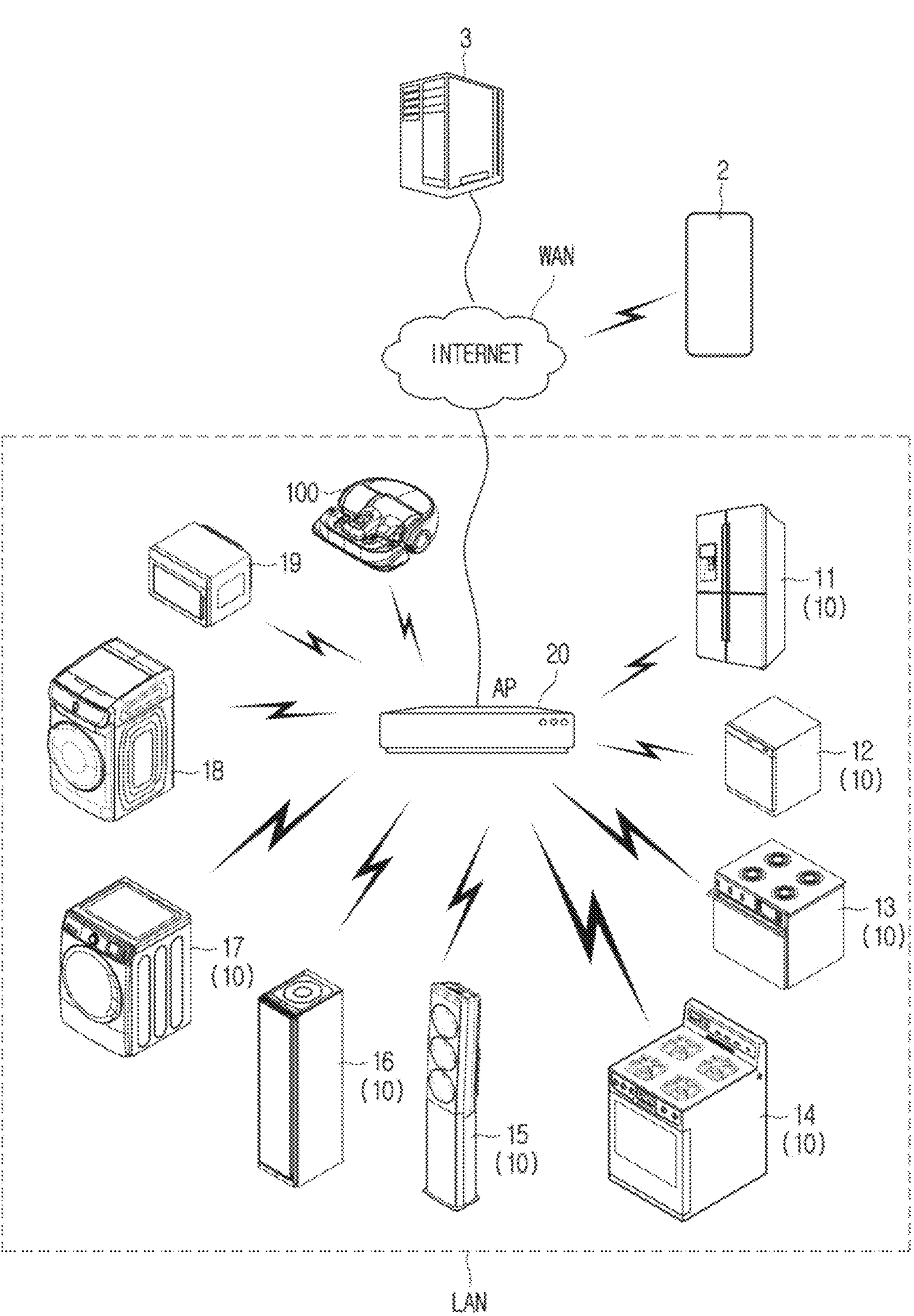
FIG. 1 is a diagram illustrating an electronic system according to an embodiment of the disclosure.

Various embodiments of the disclosure and terms used therein are not intended to limit the technical features described in the disclosure to specific embodiments, and should be understood as including all modifications, equivalents or alternatives of relevant embodiments.

With respect to the description of the drawings, like reference numerals may be used for like or associated elements.

A singular form of a noun corresponding to an item may include one or a plurality of items, unless the relevant context clearly specifies otherwise.

In the disclosure, phrases such as "A or B", "at least one of A and B", "at least one of A or B", "A, B, or C", "at least one from among A, B, and C", and "at least one from among A, B, or C" may respectively include any one from among the items listed together in the relevant phrase, or include all possible combinations thereof from among the phrases.

Terms such as "1st", "2nd", "first" or "second" may be used to simply distinguish a relevant element from another relevant element, and not limited the relevant elements in other aspects (e.g., importance or order).

When a certain (e.g., first) element is indicated as being "coupled with/to" or "connected to" another (e.g., second) element, together with or without terms such as "operatively" or "communicatively", it may mean that the certain element is coupled with/to the another element directly (e.g., via wire), wirelessly, or through a third element.

Terms such as "include" or "have" are used herein to designate a presence of a characteristic, number, step, operation, element, component, or a combination thereof, and not to preclude a presence or a possibility of adding one or more of other characteristics, numbers, steps, operations, elements, components or a combination thereof.

When a certain element is described as "coupled", "combined", "supported", or "contacted" with another element, the above may include not only the elements being directly coupled, combined, supported, or contacted, but also being indirectly coupled, combined, supported, or contacted through the third element.

When the certain element is described as positioned "on" another element, the above may include not only the certain element being contacted to another element, but also other element being present between the two elements.

The term "and/or" may include a combination of a plurality of related elements described or any element from among the plurality of related elements described.

The expression "configured to . . . (or set up to)" used in the disclosure may be used interchangeably with, for example, "suitable for . . . ," "having the capacity to . . . ," "designed to . . . ," "adapted to . . . ," "made to . . . ," or "capable of . . . " based on circumstance. The term "configured to . . . (or set up to)" may not necessarily mean "specifically designed to" in terms of hardware.

Rather, in a certain circumstance, the expression "a device configured to . . . " may mean something that the device "may perform . . . " together with another device or components. For example, the phrase "a processor configured to (or set up to) perform A, B, or C" may mean a dedicated processor for performing a relevant operation (e.g., embedded processor), or a generic-purpose processor (e.g., a central processing unit (CPU) or an application processor) capable of performing the relevant operations by executing one or more software programs stored in a memory device.

The term "module" or "part" used in the embodiments herein perform at least one function or operation, and may be implemented with a hardware or software, or implemented with a combination of hardware and software. In addition, a plurality of "modules" or a plurality of "parts," except for a "module" or a "part" which needs to be implemented to a specific hardware, may be integrated in at least one module and implemented as at least one processor.

Operations performed by a module, a program, or other element, in accordance with the various embodiments, may be executed sequentially, in parallel, repetitively, or in a heuristically manner, or at least some operations may be performed in a different order, omitted, or a different operation may be added.

The various elements and areas of the drawings have been schematically illustrated. Accordingly, the technical spirit of the disclosure is not limited by relative sizes and distances illustrated in the accompanied drawings.

Working principles and embodiments herein will be described below with reference to the accompanied drawings.

FIG. 1 is a diagram illustrating an electronic system according to an embodiment of the disclosure.

Referring to FIG. 1, a home appliance 10 may include a communication module capable of communicating with other home appliances, a user device 2, or a server 3, a user interface which receives a user input or outputs information to a user, at least one processor configured to control an operation of the home appliance 10, and at least one memory stored with a program for controlling an operation of the home appliance 10.

The home appliance 10 may be at least one from among home appliances of various types. For example, the home appliance 10 may include at least one from among a refrigerator 11, a dish washer 12, an electric range 13, an electric oven 14, an air conditioner 15, a clothes care device 16, a washer 17, a dryer 18, a microwave oven 19, and a cleaning robot 100 as shown, but is not limited thereto, and may include, for example, home appliances of various types such as a vacuum cleaner and a television. In addition, the above-mentioned home appliances are merely examples, and in addition to the above-mentioned home appliances, devices capable of performing operations which will be described below by being connected with other home appliances, the user device 2, or the server 3 may be included in the home appliance 10 according to an embodiment.

The server 3 may include a communication module capable of communicating with another server, the home appliance 10, or the user device 2, at least one processor capable of processing data received from another server, the home appliance 10, or the user device 2, and at least one memory capable of storing a program for processing data or processed data. The server 3 described above may be implemented as various computing devices such as a workstation, a cloud, a data drive, and a data station. The server 3 may be implemented as at least one server physically and logically divided based on a function, a detailed configuration of the function, data, or the like, and transmit and receive data through communication between each server and process the transmitted and received data.

The server 3 may perform functions such as managing a user account, registering the home appliance 10 by linking to the user account, and managing or controlling the registered home appliance 10. For example, the user may generate a user account by connecting to the server 3 through the user device 2. The user account may be identified by an identification (ID) and password set by the user. The server 3 may register the home appliance 10 to the user account according to a set procedure. For example, the server 3 may connect identification information (e.g., a serial number or MAC address, etc.) of the home appliance 10 to the user account, and register, manage, and control the home appliance 10. The user device 2 may include a communication module capable of communicating with the home appliance 10 or the server 3, a user interface configured to receive user input or output information to the user, at least one processor configured to control an operation of the user device 2, and at least one memory stored with a program for controlling an operation of the user device 2.

The user device 2 may be handheld by the user, or disposed at a home, an office, or the like of the user. The user device 2 may include a personal computer, a terminal, a portable telephone, a smart phone, a handheld device, a wearable device, and the like, but is not limited thereto.

In the memory of the user device 2, a program for controlling the home appliance 10 (e.g., an application) may be stored. The application may be sold installed in the user device 2, or downloaded and installed from an external server.

The user may connect to the server 3 and generate a user account by executing the application installed in the user device 2, and register the home appliance 10 by performing communication with the server 3 based on the logged-in user account.

For example, if the home appliance 10 is operated for the home appliance 10 to be able to connect with the server 3 according to a procedure guided by the application installed in the user device 2, the home appliance 10 may be registered to the user account by registering the identification information (e.g., the serial number or the MAC address, etc.) of the home appliance 10 to the relevant user account in the server 3.

The user may control the home appliance 10 by using the application installed in the user device 2. For example, if the user logs-in to the user account with the application installed in the user device 2, the home appliance registered to the user account may appear, and if a control command for the home appliance 10 is input, the control command may be transferred to the home appliance 10 through the server 3. In an example, the user may execute an application with which to control the cleaning robot, and input a cleaning command to the cleaning robot 100 using the executed application, or check a cleaning progress history, and the like.

A network may include both a wired network and a wireless network. The wired network may include a cable network or a telephone network, and the wireless network may include all networks that transmit and receive signals through radio waves. The wired network and the wireless network may be connected with each other.

The network may include a wide area network (WAN) such as the internet, a local area network (LAN) formed based on an access point (AP) 20, and a short-range wireless network that does not pass through the access point (AP) 20. The short-range wireless network may include Bluetooth (IEEE 802.15.1), Zigbee (IEEE 802.15.4), Wi-Fi Direct, Near Field Communication (NFC), Z-Wave, and the like, but is not limited thereto.

The access point (AP) 20 may connect the home appliance 10 or the user device 2 to the wide area network (WAN) to which the server 3 is connected. The home appliance 10 or the user device 2 may be connected to the server 3 through the wide area network (WAN).

The access point (AP) 20 may communicate with the home appliance 10 or the user device 2 using wireless communication such as, for example, and without limitation, Wi-Fi (IEEE 802.11), Bluetooth (IEEE 802.15.1), Zigbee (IEEE 802.15.4), and the like and connect with the wide area network (WAN) using wired communication, but is not limited thereto.

According to various embodiments, the home appliance 10 may be directly connected with the user device 2 or the server 3 without passing through the access point (AP) 20.

The home appliance 10 may be connected with the user device 2 or the server 3 through a long-range wireless network or a short-range wireless network.

For example, the home appliance 10 may be connected with the user device 2 through the short-range wireless network (e.g., Wi-Fi Direct).

In another example, the home appliance 10 may be connected with the user device 2 or the server 3 through the wide area network (WAN) using the long-range wireless network (e.g., cellular communication module).

In another example, the home appliance 10 may connect with the wide area network (WAN) using wired communication, and may be connected with the user device 2 and the server 3 through the wide area network (WAN).

If the home appliance 10 is able to connect with the wide area network (WAN) using wired communication, it may operate as an access point. Accordingly, the home appliance 10 may connect another home appliance with the wide area network (WAN) to which the server 3 is connected. In addition, the another home appliance may connect the home appliance 10 to the wide area network (WAN) to which the server 3 is connected.

The home appliance 10 may transmit information associated with an operation or a state to the another home appliance, the user device 2, or the server 3 through a network. For example, the home appliance 10 may transmit, based on a request being received from the server 3, information associated with an operation or a state to the another home appliance, the user device 2, or the server 3 when a specific event occurs in the home appliance 10, or periodically or in real-time.

The home appliance 10 may transmit information about a self-generated event to the user device 2 or the server 3. For example, if the cleaning robot 100 completes cleaning according to a planned schedule, or if an event such as an error occurring while cleaning is in progress, information about the relevant event may be transmitted to the user device 2 or the server 3.

The server 3 may update, based on information associated with an operation or a state being received from the home appliance 10, the information associated with an operation or a state of the home appliance 10, which was stored, and transmit the updated information associated with an operation or a state of the home appliance 10 to the user device 2 through the network. Here, update of information may include various operations in which existing information is changed such as an operation of adding new information to existing information, and an operation of substituting existing information with new information.

The home appliance 10 may obtain various information from the another home appliance, the user device 2, or the server 3, and provide the obtained information to the user. For example, the home appliance 10 may obtain information associated with a function of the home appliance 10 (e.g., cooking method, washing method, etc.), and various environment information (e.g., weather, temperature, humidity, etc.) from the server 3, and output the obtained information through the user interface.

The home appliance 10 may operate according to a control command received from the another home appliance, the user device 2, or the server 3. For example, the home appliance 10 may operate according to the control command received from the server 3 based on the home appliance obtaining a prior authorization of the user to operate according to the control command of the server 3 without user input. Here, the control command received from the server 3 may include a control command input by the user through the user device 2, a control command based on a preset condition, or the like, but is not limited thereto.

The user device 2 may transmit information associated with the user to the home appliance 10 or the server 3 through the communication module. For example, the user device 2 may transmit information associated with a position of the user, a health state of the user, a preference of the user, a schedule of the user, and the like to the server 3. The user device 2 may transmit information associated with the user to the server 3 according to the prior authorization of the user.

The home appliance 10, the user device 2, or the server 3 may determine the control command using technology such as artificial intelligence. For example, the server 3 may receive information associated with an operation or a state of the home appliance 10 or receive information associated with the user of the user device 2 and process the information using technology such as artificial intelligence, and transmit the processing result or the control command to the home appliance 10 or the user device 2 based on the processing result.

The cleaning robot 100 which is one from among the home appliances 10 may be a device which automatically performs a cleaning operation when driving through a space. The cleaning robot 100 as described may carry out cleaning according to a planned cleaning schedule preset by the user, or carry out cleaning according to a cleaning command provided from the server 3 or the user device 2.

The cleaning robot 100 as described may be represented with terms such as a mobile robot device, an autonomous driving robot, an autonomous driving device, a cleaning robot, or the like.

Here, the cleaning operation may mean the cleaning robot 100 suctioning foreign materials such as dirt and dust present at a bottom surface. To this end, the cleaning robot 100 may include a cleaning device (i.e., cleaning tool) for suctioning the foreign materials. The cleaning device may include a brush for picking up the foreign materials by being rotatably installed, and suction the foreign materials from the bottom surface by generating a suction force through a motor, and the like. At this time, the suctioned foreign material may be contained in a dust container provided in the cleaning robot 100.

The cleaning robot 100 may include a driving device for movement. For example, the driving device may include wheels respectively installed at a left side and right side of a main body of the cleaning robot 100, a motor for driving the wheels, and the like. Accordingly, the driving device may perform various driving operations such as, for example, and without limitation, moving, stopping, controlling speed, changing direction, changing angular speed, and the like of the cleaning robot 100.

The cleaning robot 100 may include various sensors for obtaining various information associated with the surrounding. For example, the sensor may include at least one from among a distance sensor (e.g., radio detection and ranging (Radar) a light detection and ranging (LiDAR), an infra-red (IR) sensor, an ultrasonic sensor, etc.) which measures distance with an object present at a surrounding space of the cleaning robot 100, a camera (e.g., mono camera) which obtains an image of the surrounding space of the cleaning robot 100, a depth camera (e.g., a stereo camera), a geomagnetic sensor, a fall detection sensor, a gyro sensor which detects an angular speed of the cleaning robot 100, an encoder which detects an RPM of the wheels installed in the cleaning robot 100, and the like.

The cleaning robot 100 may have various functions such as recognizing the surrounding environment, autonomous driving, collecting information, and transferring information to the user. For example, the cleaning robot 100 may recognize the surrounding environment based on voice, sound, and image recognition. In addition, the cleaning robot 100 may transfer information to the user by controlling other electronic products through wireless communication or outputting voice.

The cleaning robot 100 may allow for a stable autonomous driving by collecting and analyzing various information such as sound, voice, image and the like from the surrounding environment. For example, the cleaning robot 100 may include a microphone, a camera, a sensor, and the like for collecting information about the surrounding environment.

If the cleaning robot 100 is used within a home, the cleaning robot 100 may execute a function and collect information by interacting with electronic products such as a TV, a cleaner, and a washer disposed within the home, and transfer the collected information to family members including a pet animal. Accordingly, electronic products may be connected with all members within the home.

The cleaning robot 100 may connect the user with family members needing assistance which includes a pet animal by continuously checking and inspecting the environment within the home even when the user is absent. In addition, other home appliances may be checked and operated within the home through physical movement. Through the above, safety within the home may be sought after and security may be strengthened.

The cleaning robot 100 according to an embodiment of the disclosure may be implemented in a form which performs work within the home, but is not limited thereto, and may be implemented as a robot device according to various embodiments.

A detailed configuration and operations of the cleaning robot 100 will be described below with reference to FIG. 2 and FIG. 3.

Figure 2:
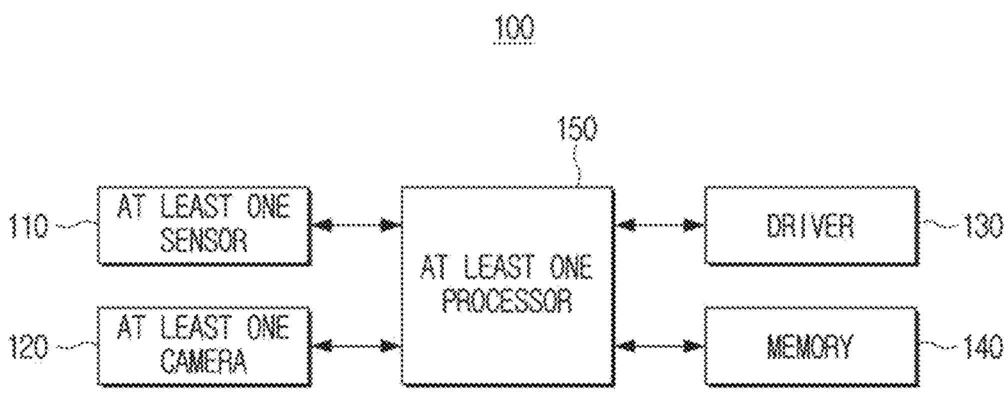
FIG. 2 is a diagram illustrating a configuration of a cleaning robot according to an embodiment of the disclosure.

FIG. 2 is a diagram illustrating a configuration of a cleaning robot according to an embodiment of the disclosure.

Referring to FIG. 2, the cleaning robot 100 may include at least one sensor 110, at least one camera 120, a driver 130, a memory 140, and at least one processor 150.

The at least one sensor 110 may be a configuration for obtaining information about the surrounding environment of the cleaning robot 100 while the cleaning robot 100 is driving. Specifically, the at least one sensor 110 may obtain sensing data of the surrounding environment of the cleaning robot 100 while the cleaning robot 100 is driving.

In an example, the at least one sensor 110 may include a depth sensor, an inertial measurement unit (IMU) sensor, a fall detection sensor, and the like. The depth sensor may be a configuration for detecting obstacles surrounding the cleaning robot 100. The at least one processor 150 may obtain a distance from the cleaning robot 100 to an obstacle based on sensing data of the depth sensor. For example, the depth sensor may include at least one from among the IR sensor, the LiDAR sensor, and a 3D sensor. The IMU sensor may be a configuration for obtaining orientation information of the cleaning robot 100. The IMU sensor may include the gyro sensor and the geomagnetic sensor. The fall detection sensor may detect a handrail, stairs, or the like through detecting a bottom surface direction. In addition to the above, the cleaning robot 100 may include various sensors for detecting the surrounding environment of the cleaning robot 100 or a state of the user.

The at least one camera 120 may be a configuration for obtaining information about the surrounding environment. Specifically, the at least one camera 120 may obtain an image according to a driving direction of the cleaning robot while the cleaning robot 100 is driving. In an example, the at least one camera may include image sensors of various types such as, for example, and without limitation, a stereo camera, an RGB camera, and the like.

The driver 130 may be a configuration for moving (or driving) the cleaning robot. For example, the driver 130 may include wheels which move (or drive) the cleaning robot 100 and a wheel driving motor which rotates the wheels. In addition, the driver 130 may include a motor driving circuit which supplies driving current to various motors, and a rotation detecting sensor which detects a rotation displacement and a rotation speed of a motor.

The memory 140 may be implemented as an internal memory such as, for example, and without limitation, a read-only memory (ROM) included in the at least one processor 150 (e.g., an electrically erasable programmable read-only memory (EEPROM)), a random access memory (RAM), and the like, or implemented as a memory separate from the processor 150. In this case, the memory 140 may be implemented in a memory form embedded to the cleaning robot 100 according to a data storage use, or implemented in a memory form attachable to or detachable from the cleaning robot 100. For example, data for driving the cleaning robot 100 may be stored in the memory embedded in the cleaning robot 100, and data for an expansion function of the cleaning robot 100 may be stored in the memory which is attachable to or detachable from the cleaning robot 100.

The memory 140 may store an operating system (OS) for controlling the overall operation of elements of the cleaning robot 100 and instructions or data associated with the elements of the cleaning robot 100. In addition, the memory 140 may store a kernel configuration (e.g., an IPC driver, a camera driver (e.g., camera device driver 232), a graphic driver, and a power management program) and the like for controlling various sensors, cameras, and the like within the cleaning robot.

Specifically, the memory 140 may store map data of within the home. Further, the memory 140 may store sensing data obtained from the at least one sensor 110 while driving.

The at least one processor 150 may control the overall functions and operations of the cleaning robot 100 by being electrically connected with the memory 140. Specifically, the at least one processor 150 may perform a cleaning operation based on the map data stored in the memory 140.

The at least one processor 150 may be implemented as a digital signal processor (DSP) which processes a digital signal, a microprocessor, or a time controller (TCON). However, the embodiment is not limited thereto, and may include one or more from among a central processing unit (CPU), a micro controller unit (MCU), a micro processing unit (MPU), a controller, an application processor (AP), a graphics-processing unit (GPU), a communication processor (CP), or an ARM processor, or may be defined by the relevant term. In addition, the at least one processor 150 may be implemented as a System on Chip (SoC) or a large scale integration (LSI) embedded with a processing algorithm, and may be implemented in a form of a field programmable gate array (FPGA). In addition, the at least one processor 150 may perform various functions by executing computer executable instructions stored in the memory. The at least one processor 150 may include a plurality of processors (e.g., CPU+GPU, CPU+DSP).

The at least one processor 150 may identify an object by using sensing data obtained from the at least one sensor 110 or an image obtained from the at least one camera 120 while performing a cleaning operation.

The at least one processor 150 may generate a driving route (or a cleaning route) based on the map data stored in the memory 140, and control the driver 130 to cause the cleaning robot 100 to move along the generated driving route.

The at least one processor 150 may identify the surrounding environment while the cleaning robot 100 is moving, and control each configuration within the cleaning robot based on the identified surrounding environment.

For example, the at least one processor 150 may check for the presence of obstacles (an abnormal object, stairs, a handrail) within a preset distance on the driving route of the cleaning robot and identify whether it is a route that is safe (hereinafter, a safe route) or a route that requires caution (hereinafter, a caution route). Here, the safe route may include an example in which there is no object expected to collide with the cleaning robot present on a moving route for a certain time or a certain distance, and may be referred to as a normal route, a general route, a safe state, a normal state, and the like.

The caution route may include an example of an obstacle (or handrail, stairs, etc.) and the like being present within a preset time or a certain distance, and may be referred to as a danger route, an obstacle route, a danger state, a caution state, and the like. Although, it has been divided into whether it is a safe route or a caution route, that is, two steps according to the surrounding environment below, it may be more subdivided at implementation and may be divided into at least three states.

The at least one processor 150 may adjust a priority order of internal data processing according to whether it is the identified safe route or the caution route. For example, the at least one processor 150 may perform, based on the driving route being identified as the safe route, a video capturing in at least one camera at a relatively low resolution and/or a low frame rate, or perform video processing by changing the resolution or the frame rate of the captured video to low. In addition, the at least one processor 150 may control the kernel to not operate with respect to some sensors from among a plurality of sensors, or not receive input of an output signal of at least one sensor from among the plurality of sensors if it is determined as the safe route.

Conversely, if the driving route is determined to be the caution route, the at least one processor may raise the priority order for the video processing of the captured video. The operation as described will be described in detail in FIG. 5 to FIG. 9.

The at least one processor 150 may determine, based on an abnormal object being detected on the moving route (i.e., the driving route), whether the relevant object is to be moved or whether avoidance is necessary, and control the driver 130 to move or avoid the object according to the determined method.

The at least one processor 150 may associate information about the abnormal object described above with a position on the map data and store in the memory 140. For example, if the above-described abnormal object is determined as a fixed object, the at least one processor 150 may reflect the detected abnormal object in the map data, or if it is identified as a movable toy, a small object, or the like, the information about the abnormal object may be stored in the memory 140 for the relevant object to be moved to a specific position or to be left alone according to a user setting.

The at least one processor 150 may generate a map image based on the stored map data.

The at least one processor 150 may control the driver 130 to return to a charging station when cleaning is completed. Then, the at least one processor 150 may store a cleaning history.

The at least one processor 150 may check, based on it being verified that an error occurred in a configuration within the cleaning robot or in the cleaning robot while cleaning or in movement, whether there is a configuration that can substitute the configuration in which the error occurred.

If there is another configuration which can substitute the configuration in which the error occurred, the at least one processor 150 may provide data of a substitute configuration rather than data of the configuration in which the error occurred to an application that uses the configuration in which the error occurred. For example, if an error occurred in the RGB camera, the at least one processor 150 may provide data of the stereo camera to the application using the data of the RGB camera. Alternatively, if an error occurred in the IR sensor, the at least one processor 150 may provide distance information generated from the stereo camera to the application using the data of the IR sensor. An embodiment as described above will be described below in FIG. 11.

The cleaning robot according to an embodiment as described above may reduce, by identifying the surrounding environment and adjusting the priority order of data of each configuration according to the identified surrounding environment, heating and the like of internal configurations by limiting use of some sensors while in a safe driving state, and prevent a video processing delay and the like by applying a high priority order to processing such as recognizing surrounding objects, and the like when in a driving state that requires caution.

In the above, only a simple configuration of the cleaning robot 100 has been shown and described, but various configurations may be additionally included. The above will be described below with reference to FIG. 3.

Figure 3:
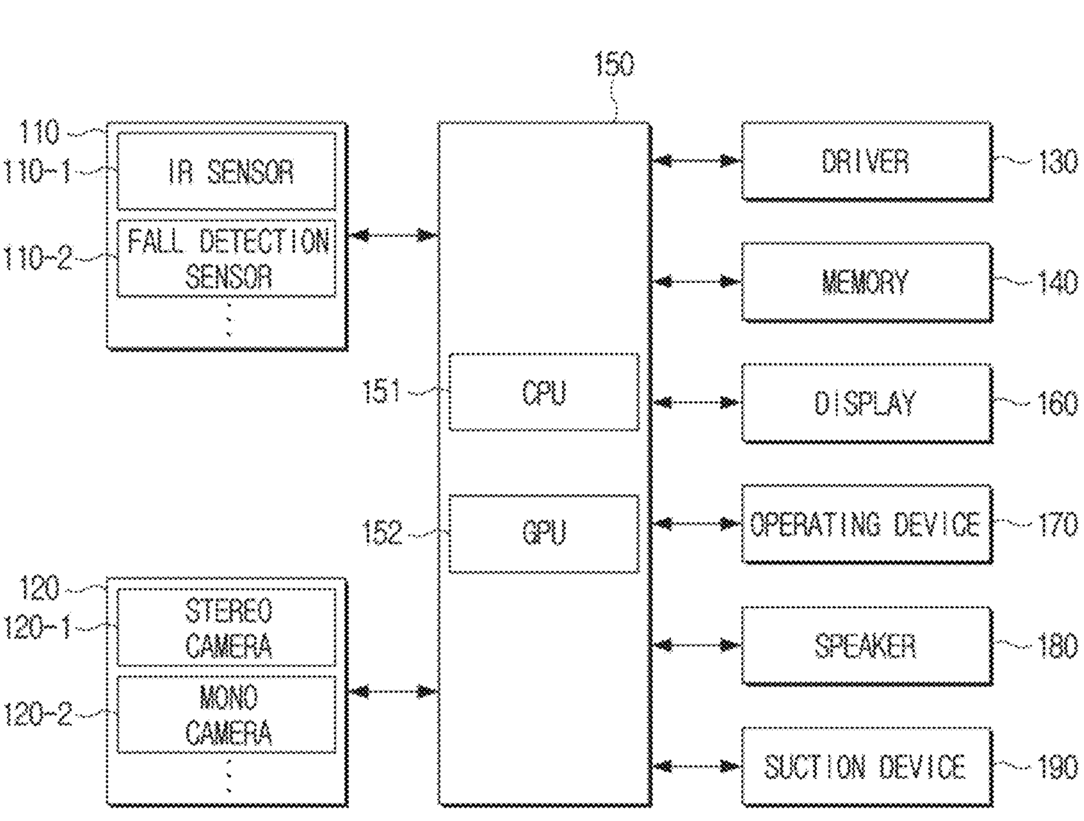
FIG. 3 is a diagram illustrating a configuration of a cleaning robot according to an embodiment of the disclosure.

FIG. 3 is a diagram illustrating a configuration of a cleaning robot according to an embodiment of the disclosure.

Referring to FIG. 3, the cleaning robot 100 may include the at least one sensor 110, the at least one camera 120, the driver 130, the memory 140, the at least one processor 150, a display 160, an operating device 170, a speaker 180, and a suction device 190.

The at least one sensor 110 may include an IR sensor 110-1 and a fall detection sensor 110-2.

The IR sensor 110-1 may be a configuration for detecting surrounding obstacles, and the at least one processor 150 may obtain a distance to an obstacle based on a signal output from the IR sensor 110-1.

The fall detection sensor 110-2 may be a configuration for detecting a danger element of the bottom surface, and may be a sensor for preventing falling of the cleaning robot 100. The at least one processor 150 may identify whether there is danger at a floor part based on a signal output from the fall detection sensor 110-2. In the example shown, only two sensors have been shown and described, but at implementation, only a portion of the sensors may be included, and sensors which are not shown may be additionally used.

The at least one camera 120 may include a stereo camera 120-1 and a mono camera 120-2 (e.g., the RGB camera).

The stereo camera 120-1 may be a configuration for recognizing a distance with an object by using two captured images.

The mono camera 120-2 may provide the user with a video, or may be used for a purpose of recognizing an object by being positioned at a front direction thereof. In the shown example, although two cameras are shown and described as included, only one may be included at implementation, or another camera which is not shown may be additionally used.

Because the driver 130 and the memory 140 have been described in FIG. 2, redundant descriptions thereof will be omitted.

The at least one processor 150 may include a CPU 151 and a GPU 152. Here, the GPU 152 may be a processor dedicated to video processing and the like, and may perform video processing of videos captured from the at least one camera 120.

The CPU 151 may process a signal output from the at least one sensor 110, or perform video processing of videos captured from the at least one camera 120. As described above, although the CPU 151 may perform video processing of captured videos, it may be slower than being processed in the GPU 152.

The at least one processor 150 may process the captured videos differently depending on whether the driving route is the caution route or the safe route. For example, the at least one processor 150 may set the video processing of the captured videos to a most important priority order in the caution route, and have it processed in the GPU 152 if possible. That is, tasks other than video processing of videos may be scheduled to be processed in the CPU 151 and not the GPU 152 while the robot is on the caution route.

Then, not only the processing of videos, but also various tasks may all be scheduled to be processed in the respective GPU or the CPU in the safe route. For example, the CPU or the GPU may be selectively used according to an operating state of the CPU and the GPU. The above-described embodiment will be described below in FIG. 6 and FIG. 7.

The display 160 may display a user interface window or an indicator for a function supported by the cleaning robot 100 to be selected. For example, the display 160 may display information corresponding to each state of whether an error has occurred in the cleaning robot, whether cleaning is in progress, whether charging is in progress, and the like.

The operating device 170 may receive input of a selecting a function of the cleaning robot 100 and a control command for the relevant function from the user. Through the operating device 170 as described, a cleaning command, a stop cleaning command, a return to charging station command, and the like may be input from the user.

The speaker 180 may be a device which outputs sound. For example, the speaker 180 may output information corresponding to a state of the cleaning robot 100 in a notification sound or voice. In an example, if an error occurs, information about the error may be output, or a state such as cleaning being completed and the like may be output in a notification sound, or the like.

The suction device 190 may suction contaminants such as dust through a suction hole of the bottom surface if configurations such as a motor is included.

In showing and describing FIG. 3, various configurations have been shown as included in the cleaning robot 100, but some of the configurations may be implemented in an omitted form at implementation. Additional configurations may be further included. For example, a communication device for performing communication with another device or the user device may be further included.

Figure 4:
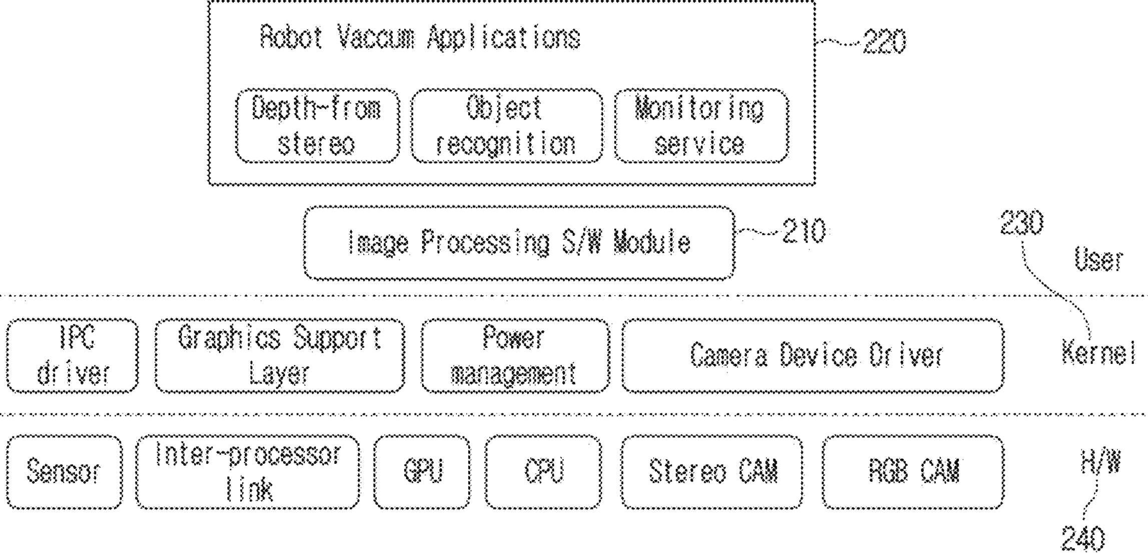
FIG. 4 is a diagram illustrating an architecture of a cleaning robot according to an embodiment of the disclosure.

FIG. 4 is a diagram illustrating an architecture of a cleaning robot according to an embodiment of the disclosure.

Referring to FIG. 4, the architecture of the cleaning robot may be divided into a hardware level 240, a kernel level 230, and an operating system level 210/220.

The hardware level 240 may be where various hardware configurations provided within the cleaning robot 100 are positioned. For example, the hardware level 240 may include at least one sensor, an inter-processor link, the GPU, the CPU, the stereo camera, the RGB camera, and the like.

The kernel level 230 may be a level which connects between the operating system and the hardware level, and where various drivers and the like may be included. For example, the IPC driver, a graphic layer, a power management, the camera driver, and the like may be included.

The operating system level 210/220 may include an image processing module 210 and applications 220 of the cleaning robot that perform operations of the disclosure.

The applications 220 may include an application which identities depth through a video of the stereo camera, an application which recognizes an object through the video, an application which monitors the cleaning robot overall, and the like.

The image processing module 210 may recognize the surrounding environment as described in FIG. 2 and FIG. 3, and adjust the priority order of data within the cleaning robot according to the recognized surrounding environment. Alternatively, the image processing module 210 may perform, if an error occurs in a specific internal configuration, an operation to substitute the relevant error. An operation of the image processing module 210 will be described below with reference to FIG. 4 to FIG. 11.

Figure 5:
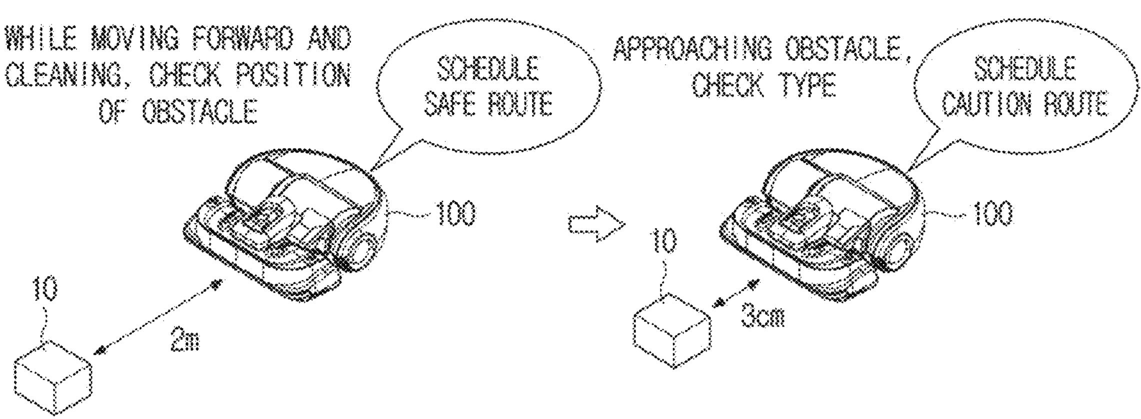
FIG. 5 is a diagram illustrating a situation determining operation according to an embodiment of the disclosure.

FIG. 5 is a diagram illustrating a situation determining operation according to an embodiment of the disclosure.

Referring to FIG. 5, the cleaning robot may recognize the surrounding environment. Specifically, the cleaning robot may analyze a video captured from a camera within the cleaning robot, or check whether a dangerous material, obstacle, and the like are present within a preset distance through a signal received from the IR sensor.

If it is determined that there is no abnormal object, obstacle, and the like present within the preset distance based on checking as described above, the cleaning robot may determine the driving route to be the safe route. Alternatively, if it is determined that there is an abnormal object, and the like within the preset distance, the cleaning robot may determine the driving route to be the danger route.

An operation of the cleaning robot based on the above-described determination result will be described below.

First, an operation of the cleaning robot on the safe route will be described. During the moving process, the IR sensor or the fall detection sensor is continuously operated, and signals input from these sensors are continuously checked. However, based on having checked the above-described situation, if there is no object to collide with or no fall risk area present during a preset period (or distance therebetween), use of the IR sensor or the fall detection sensor is not necessary.

Specifically, in the disclosure, if it is determined that the robot is traveling on a safe section, an operation of the at least one sensor may be stopped based on a likelihood of an error occurring for heating problems and the like when the IR sensor is continuously operated. Accordingly, because an error which may be generated by a continuous operation of the sensor may be prevented in advance from occurring, and an operation of unnecessarily analyzing output data of the sensor may also be omitted, burden to the cleaning robot 100 may be reduced.

Conversely, an operation of the cleaning robot when on the danger route will be described. If an obstacle is positioned quite adjacently as shown during the moving process, a video processing or an operation of the IR sensor for recognizing the relevant obstacle is quite important. Accordingly, in this case, the cleaning robot 100 may adjust tasks and the like which are not associated with identifying the obstacle to a low priority processing, and adjust data of the IR sensor and/or video processing from the stereo camera, and the like to a high priority order. Through the adjustment as described above, an occurrence of a delay in an analysis process of data of the IR sensor or the video of the stereo camera may be reduced.

Figure 6:
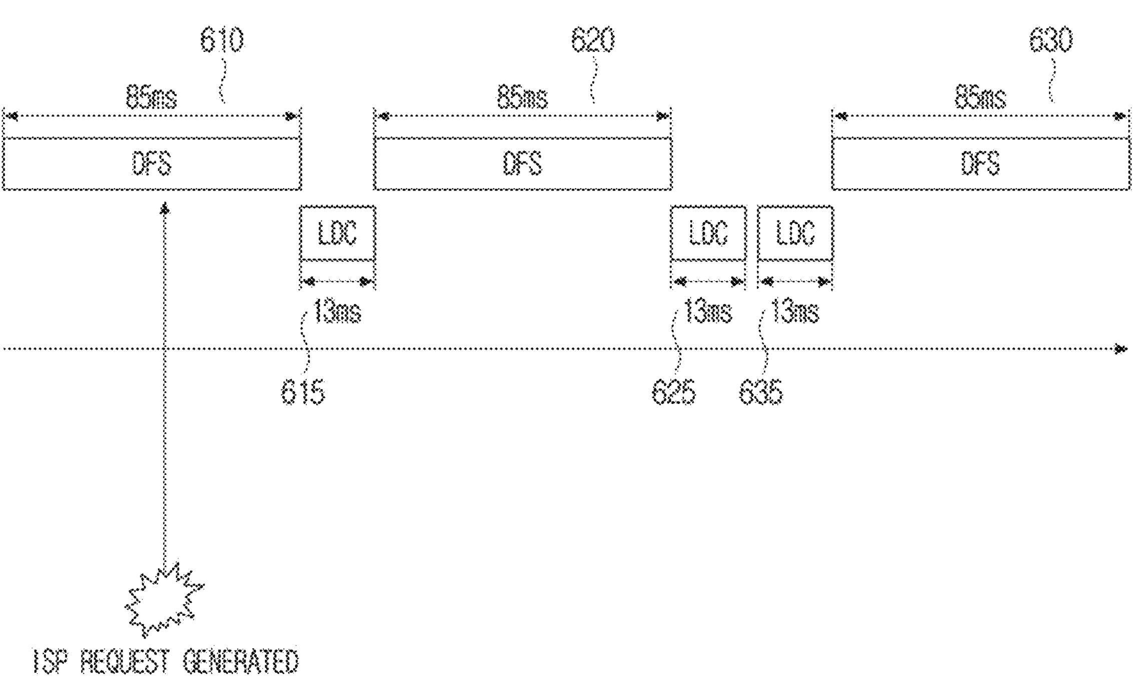
FIG. 6 is a diagram illustrating an operation for determining a subject of video processing according to an embodiment of the disclosure.

FIG. 6 is a diagram illustrating an operation for determining a subject of image processing according to an embodiment of the disclosure.

Referring to FIG. 6, the cleaning robot 100 may perform DFS tasks 610, 620, and 630 and LDC tasks 615, 625, and 635 using the GPU. Here, depth from stereo (DFS) task may be a task which checks a three dimensional depth information from a stereo video as a part of image signal processing. Further, lens distortion correction (LDC) may be a task for correcting a video distortion of a wide-angle lens as a part of image signal processing.

The cleaning robot 100 carries out the above-described DFS work and LDC work to integrate the video obtained through the camera, but a delay may occur because the GPU typically performs on a one task basis, and if the DFS task is in progress, the LDC task may be performed after the DFS task is completed.

However, because the LDC task is a task that is performed in a relatively short time compared to the DFS task as shown, it may be faster to process in the CPU rather than waiting until the GPU is able to process the task unless the CPU is in a full node.

An operation for the above will be described below in FIG. 7.

Figure 7:
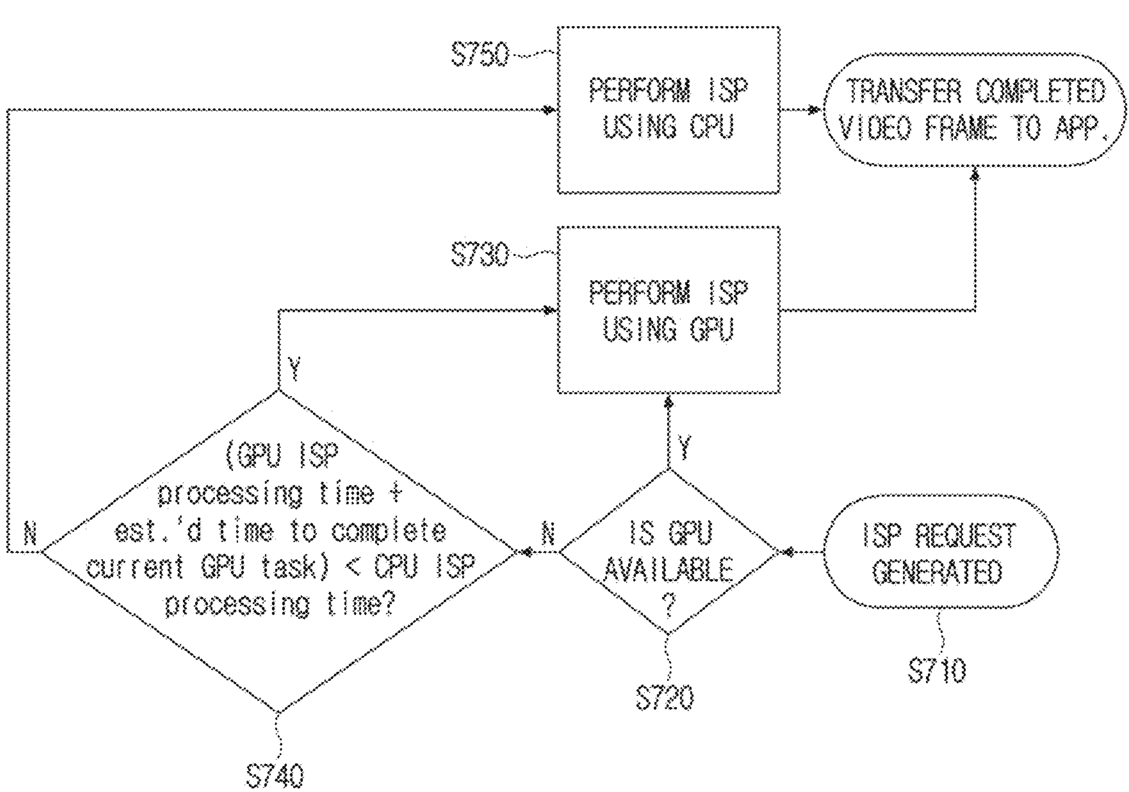
FIG. 7 is a flowchart illustrating a method for determining a subject of video processing according to an embodiment of the disclosure.

FIG. 7 is a flowchart illustrating a method for determining a subject of image processing according to an embodiment of the disclosure.

Referring to FIG. 7, if a request for a video processing task (ISP) occurs (S710), the cleaning robot 100 may check whether the GPU is usable (S720). Specifically, it may be checked as to whether the GPU can immediately perform the new ISP task.

If, the GPU is able to immediately perform the new ISP task (S720—Y), the cleaning robot 100 may determine that the new ISP task is to be performed in the GPU, and transfer the relevant task to the GPU (S730).

Conversely, if the GPU is not able to immediately perform the new ISP task (S720—N), the cleaning robot 100 may selectively select the CPU or the GPU to perform the new ISP task according to an operating state of the CPU and the GPU (S730). Specifically, the cleaning robot 100 may select, for the above-described selection, the CPU or the GPU for performing video processing using a processing time for video processing in the GPU, a video processing time in the CPU, and an estimated time of completion of a current task in the GPU.

For example, if a completion time of a current task in the GPU is 30 ms, processing of the new ISP task in the GPU may be calculated as about 43 ms. Further, if an ISP task processing time in the CPU is calculated as about 40 ms, the new task may be allocated to the CPU based on the determination that the task will be completed at a faster time through a comparison of the two values. The above-described values may be calculated and stored in advance by a manufacturer. For example, time necessary in processing a DFS processing in the GPU (e.g., 13 ms) and time necessary for LDC processing for each CPU load state (e.g., 40 ms when load is 60%, 50 ms when load is 80%, etc.) may be stored as look-up table values in advance, and the cleaning robot may perform calculation operations as described above by storing DFS task start time-points.

Through the operation as described above, if it is determined to be performed in the GPU (S740—Y), the new ISP task may be performed in the GPU (S730). Conversely, if it is determined to be performed in the CPU (S740—N), the new ISP task may be performed in the CPU (S750).

If the task is completed through the CPU or the GPU, the completed result may be provided to the application that requested the relevant task.

Figure 8:
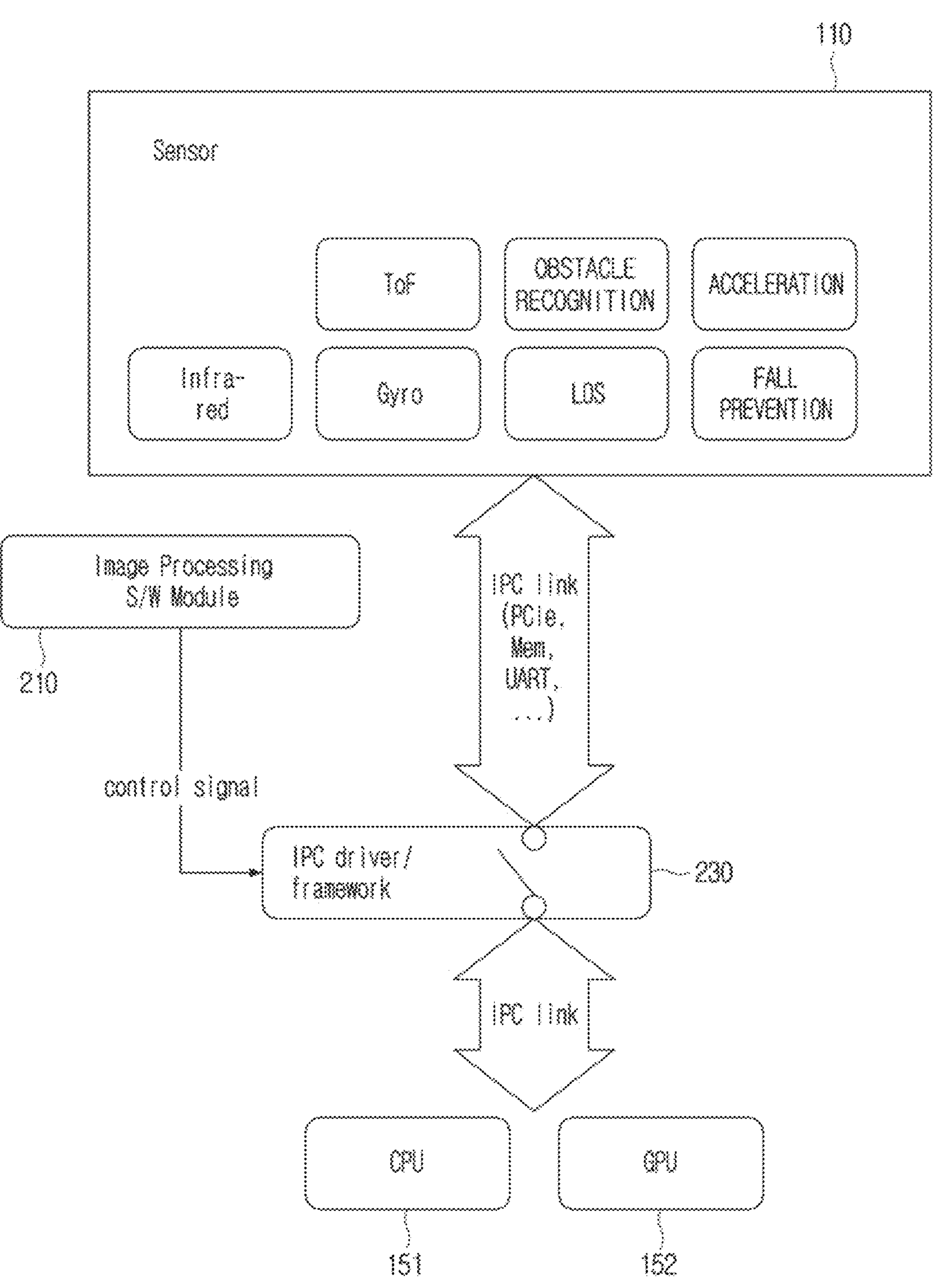
FIG. 8 is a block diagram illustrating a kernel control method according to an embodiment of the disclosure.
Figure 9:
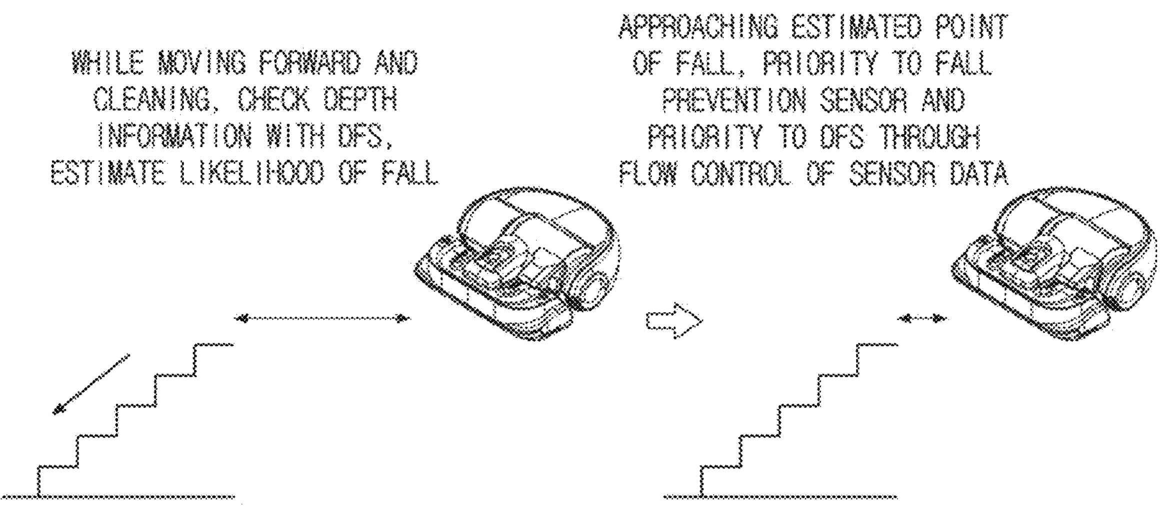
FIG. 9 is a diagram illustrating a sensor control operation based on determining a situation according to an embodiment of the disclosure.

FIG. 8 is a flowchart illustrating a kernel control method according to an embodiment of the disclosure. FIG. 9 is a diagram illustrating a sensor control operation based on determining a situation according to an embodiment of the disclosure.

In FIG. 5, the feature of checking the surrounding environment, identifying whether it is a safe route or a caution route, and adjusting the priority order of data processing accordingly has been described. In FIG. 8, a method of controlling an output of a sensor according to whether it is the safe route or the caution route which was checked in the previous process will be additionally described.

Specifically, if the driving route is identified as the safe route, for example, if it is determined that the likelihood of falling is small, there is no need to operate a fall prevention sensor. In this case, the priority order of processing of data of the fall prevention sensor may be lowered and processed as described above, but an operation of the fall prevention sensor may be stopped, or an output signal of the specific sensor may be controlled so as to be not provided to the CPU or the GPU by controlling a kernel 230 of the cleaning robot as shown in FIG. 8.

Conversely, if it is identified that there is a likelihood of falling, there may be, for example, stairs positioned at a front of the moving path as shown in FIG. 9.

As described above, when there is no likelihood of falling, an operation of the fall prevention sensor may be stopped as above, or the kernel 230 may be controlled such that an output of the relevant sensor is not provided to the CPU, and the like.

However, if it becomes a state in which there is a likelihood of falling by movement, the kernel 230 may be controlled to perform an operation of the fall prevention sensor.

Further, if the likelihood of falling becomes great by movement as shown in FIG. 9, the priority order for the output signal of the fall prevention sensor may be raised such that it is processed at a higher priority order than other configurations.

Figure 10:
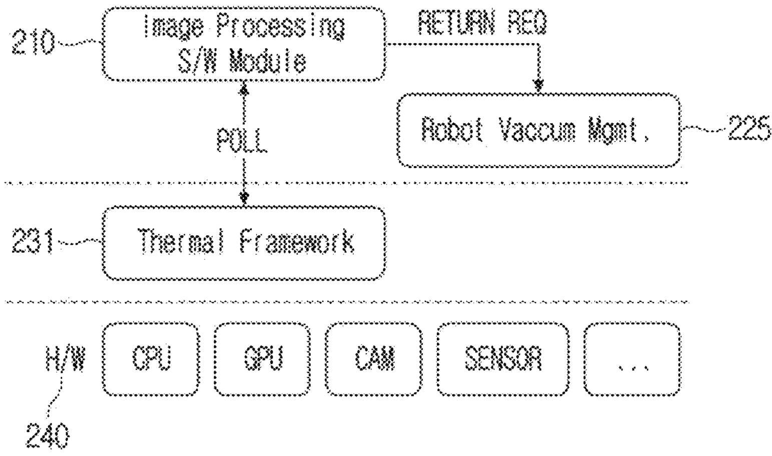
FIG. 10 is a diagram illustrating an operating example of when an error occurs according to an embodiment of the disclosure.

FIG. 10 is a diagram illustrating an operating example of when an error occurs according to an embodiment of the disclosure.

As described above, video processing is important to the function of the cleaning robot. However, because not only video processing, but also various signals and the like, are processed through the CPU, the GPU, and the like, problems such as heating and the like may occur.

However, the image processing module 210 may check temperatures of various hardware configurations from a thermal framework 231 which monitors heat of hardware configurations, and compare the checked temperatures with a preset temperature and identify whether there is abnormality. Here, the monitoring hardware configuration may be the CPU 151, the GPU 152, the sensor 110, the camera 120, and the like, but the disclosure is not limited thereto, and may be any configuration other than the configurations above if a hardware operation is not able to operate normally due to heating.

For example, if the GPU 152 is overheated due to an image processing operation, the image processing module 210 may identify, based on the GPU temperature obtained from the thermal framework 231, whether the temperature of the relevant GPU is overheated. The pre-set temperature used may be different for each hardware configuration, and may have a hysteretic value.

In addition, the above-described value may have two values for each hardware configuration (e.g., a first temperature, and a second temperature which is higher than the first temperature). For example, an abnormality may be determined as having occurred if any one from among the hardware configurations are detected to have greater than or equal to the second temperature, and an abnormality may be determined as having occurred if a plurality (or greater than or equal to a certain number) from among the hardware configurations are detected to have greater than or equal to the first temperature.

The image processing module 210 may, based on an abnormality being identified as having occurred, stop the cleaning operation and return the cleaning robot to the charging station. That is, the image processing module 210 may execute a station returning application 225, and the cleaning robot 100 may return to the charging station.

Due to the return determination as described above, if the cleaning robot 100 has to return to the charging station but is in a state in which returning to the charging station is not possible, the cleaning robot 100 may stop operation at its current position and notify the user of an error state. For example, if heating in the motor of the driver has occurred, or if heating in the IR sensor which is necessary to find the robot station has occurred and cannot be operated, returning to the charging station may be stopped and an error having occurred may be notified to the user at its present position.

After returning as described, if the temperature of the hardware configurations are changed to normal, the image processing module 210 may resume the cleaning task.

Figure 11:
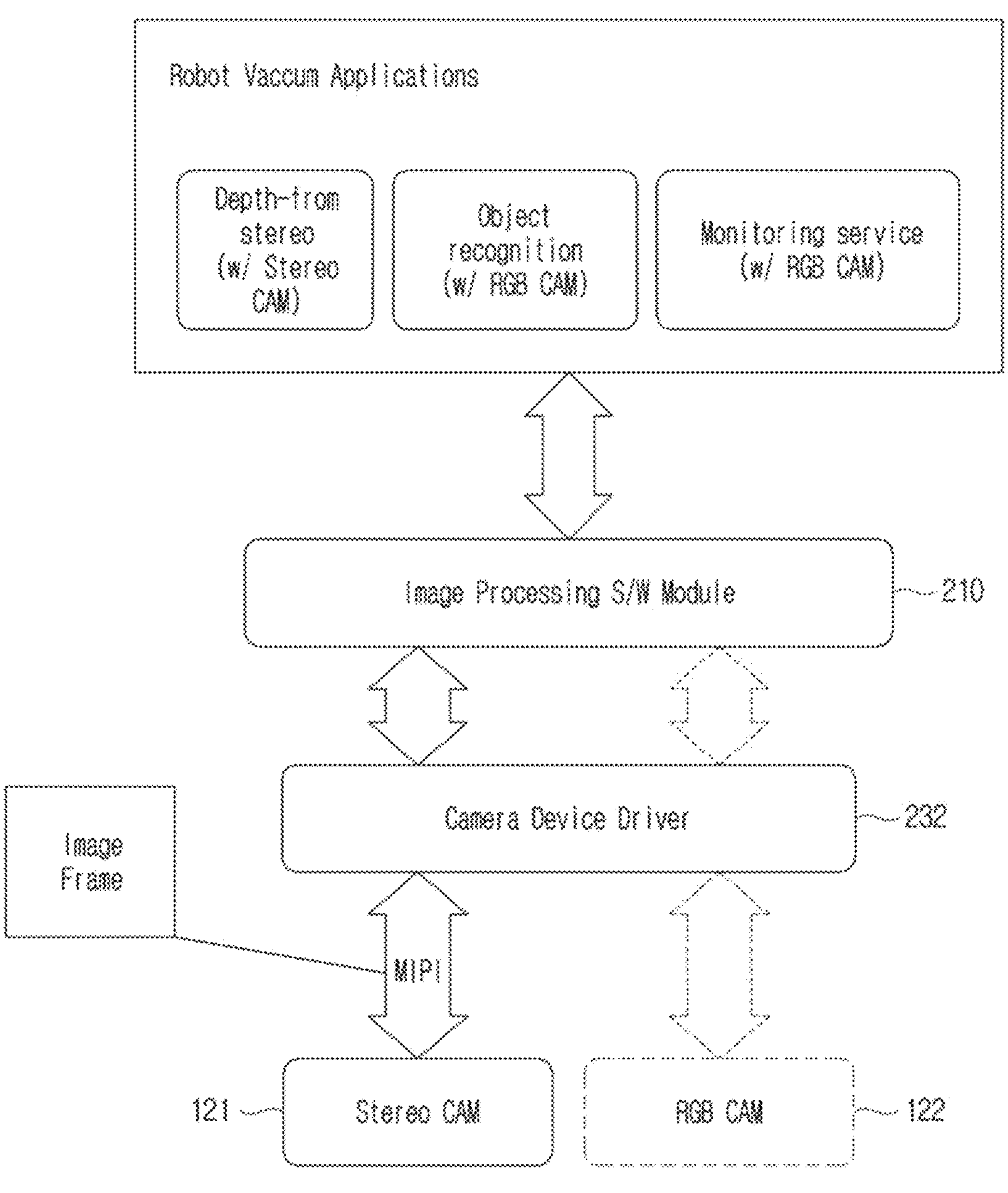
FIG. 11 is a block diagram illustrating an operating example of when an error occurs according to an embodiment of the disclosure.

FIG. 11 is a diagram illustrating an operating example of when an error occurs according to an embodiment of the disclosure.

Referring to FIG. 11, it may be assumed that the cleaning robot 100 includes a plurality of cameras, and an abnormality has occurred in one camera (e.g., RGB camera 122) from among the plurality.

In the related art, if an error occurred in one from among the hardware configurations, the cleaning robot stopped an operation and returned to the charging station.

However, with the RGB camera 122, even a video of a stereo camera 121 may be used in that the user uses the above for the purpose of identifying the state of the cleaning robot and the like.

Accordingly, the image processing module 210 may provide, based on an abnormality of the RGB camera 122 being identified, a video of another camera (e.g., stereo camera 121) to an application (e.g., an object recognition application, a surveillance application) using the video of the RGB camera.

Conversely, if an abnormality in the stereo camera 121 is identified, and the RGB camera 122 is operating normally, a video captured from the RGB camera may be provided to the application which uses the video of the stereo camera. If the relevant application is an application that calculates a distance with an object, the image processing module 210 may provide a sensing value of the video captured from the RGB camera and a distance measuring sensor to the relevant application.

At implementation, although only an example of substituting with a video captured with another camera has been described in case an abnormality has occurred in the camera, another sensor or a captured video of a camera may be used in case an abnormality has occurred in the sensor other than the camera.

As described previously, an operation of the at least one sensor being stopped in the safe route has been described. If an error occurred in the fall detection reflecting the operation described above, and there is no likelihood of falling through an analysis of the video captured from the camera, the image processing module 210 may provide a signal value corresponding to the likelihood of falling not occurring to an application which uses the fall detection sensor.

In addition, if an error has occurred in the IR sensor and there is no likelihood of a collision occurring with a specific object on a driving route through analyzing the video captured in the camera, the image processing module 210 may provide a signal value indicating that there is no specific object in an adjacent space to an application which uses the IR sensor.

In the above, if an abnormality of the above-described IR sensor or an abnormality in the fall detection sensor occurs, operating by substituting with another configuration has been described, but the above-described substitution may only be applied in a temporary or in a specific circumstance. For example, if the cleaning robot has to return to the charging station due to an abnormality in the IF sensor or the fall detection sensor, an operation of returning to the charging station may be performed by utilizing the video captured in the camera, and the like as described above other than the configuration in which an abnormality has occurred.

Figure 12:
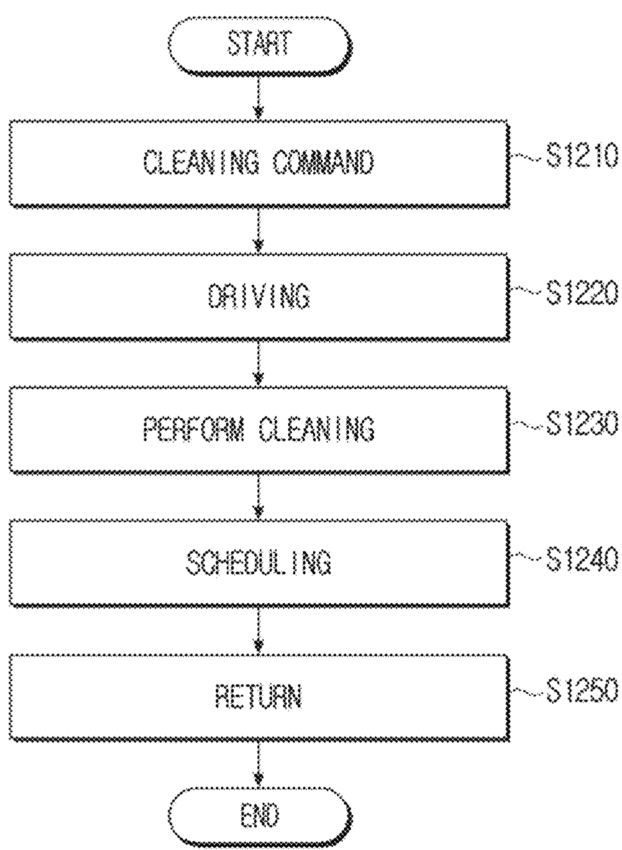
FIG. 12 is a flowchart illustrating a control operation of a cleaning robot according to an embodiment of the disclosure.

FIG. 12 is a flowchart illustrating a control operation of a cleaning robot according to an embodiment of the disclosure.

Referring to FIG. 12, a cleaning command for the cleaning robot may be input (S1210). The cleaning command as described may be input from the user terminal device or the server, or when a cleaning time arrives according to a pre-set cleaning schedule.

As described above, when a cleaning command is input, the cleaning robot may move to perform cleaning (S1220). Specifically, the cleaning robot may identify a moving route using a pre-stored map, and drive along the identified moving route.

Then, the cleaning robot may perform the cleaning task by operating cleaning members and the like along the driving route (S1230).

The cleaning robot in a cleaning operation or in movement as described above may identify the surrounding environment, and adjust the processing priority order of data according to the identified surrounding environment or perform scheduling (S1240). The operation as described will be described below with reference to FIG. 13.

Then, when cleaning is completed, the cleaning robot may return to the charging station (S1250).

A control method according to an embodiment as described above may include identifying the surrounding environment, and adjusting the priority order of data of each configuration according to the identified surrounding environment, and in the safe driving state, heating and the like of internal configurations may be reduced by limiting the use of some sensors, and in a driving state which requires caution, delay in video processing and the like may be prevent because a high priority to processing such as recognizing surrounding objects and the like is given. The control method of FIG. 12 may be performed in the cleaning robot of FIG. 2 or FIG. 3, and may be performed in a cleaning robot which has a different configuration from that of FIG. 2 or FIG. 3.

Figure 13:
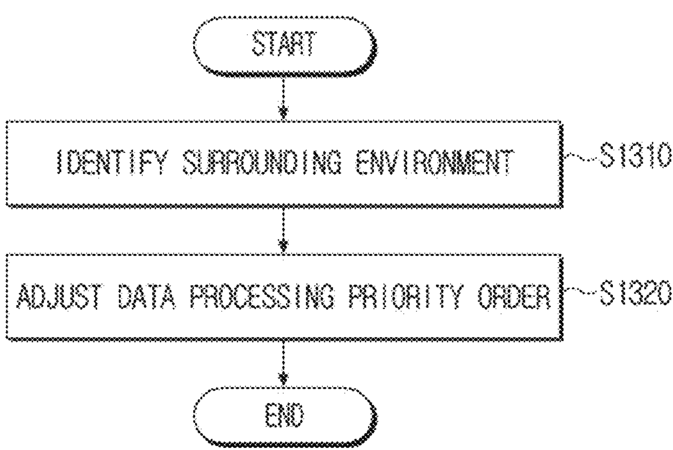
FIG. 13 is a flowchart illustrating an operation of adjusting a processing priority order of data based on a surrounding environment according to an embodiment of the disclosure.

FIG. 13 is a flowchart illustrating an operation of adjusting a processing priority order of data based on a surrounding environment according to an embodiment of the disclosure.

Referring to FIG. 13, the cleaning robot may identify the surrounding environment using a video captured in the at least one camera provided in the cleaning robot while the cleaning robot is driving (S1310). For example, the cleaning robot may check whether an obstacle is present within a preset distance on the driving route of the cleaning robot and identify whether it is the safe route or the caution route.

Then, the processing priority order of data obtained from a video captured in the at least one camera and from the at least one sensor provided in the cleaning robot may be adjusted based on the identified surrounding environment (S1320). For example, the cleaning robot may raise the priority order of video processing of the captured video if the driving route is identified as the caution route, or raise the priority order of the fall detection sensor if the driving route is identified as a fall route.

Conversely, if the driving route is identified as the safe route, the cleaning robot may perform video processing by converting at least one from among a resolution and a frame rate of the captured video, stop operation of the at least one sensor, or control the kernel of the cleaning robot to not receive input of an output signal of the at least one sensor.

In addition, the cleaning robot may perform scheduling so as to perform video processing of the captured video by selectively using the CPU or the GPU according to the operating state of the CPU and the GPU. For example, the CPU or the GPU may be selected to perform video processing based on a processing time of video processing in the GPU, a video processing time in the CPU, and an estimated time of completion of the current task in the GPU.

The operation according to an embodiment as described above may include identifying the surrounding environment, and adjusting the priority order of data of each configuration according to the identified surrounding environment, and in the safe driving state, heating and the like of internal configurations may be reduced by limiting the use of some sensors, and it the driving state which requires caution, delay in video processing and the like may be prevent because a high priority to processing such as recognizing surrounding objects and the like is given. The control method of FIG. 13 may be performed in the cleaning robot of FIG. 2 or FIG. 3, and may also be performed in a cleaning robot which has a different configuration from that of FIG. 2 or FIG. 3.

According to an embodiment of the disclosure, the various embodiments described above may be implemented with software including instructions stored in a machine-readable storage media (e.g., computer). The machine may call an instruction stored in the storage medium, and as a device operable according to the called instruction, may include an electronic apparatus (e.g., electronic apparatus (A)) according to the above-mentioned embodiments. Based on a command being executed by the processor, the processor may directly or using other elements under the control of the processor perform a function corresponding to the command. The command may include a code generated by a compiler or executed by an interpreter. The machine-readable storage medium may be provided in a form of a non-transitory storage medium. Herein, "non-transitory" merely means that the storage medium is tangible and does not include a signal, and the term does not differentiate data being semi-permanently stored or being temporarily stored in the storage medium. For example, the "non-transitory storage medium" may include a buffer in which data is temporarily stored. According to an embodiment, a method according to various embodiments described above may be provided included a computer program product. The computer program product may be exchanged between a seller and a purchaser as a commodity. The computer program product may be distributed in the form of the machine-readable storage medium (e.g., a compact disc read only memory (CD-ROM)), or distributed online (e.g., downloaded or uploaded) through an application store (e.g., PLAYSTORE™) or directly between two user devices (e.g., smartphones). In the case of online distribution, at least a portion of the computer program product (e.g., downloadable app) may be stored at least temporarily in the storage medium such as a server of a manufacturer, a server of an application store, or a memory of a relay server, or temporarily generated.

Various embodiments of the disclosure may be implemented with software including instructions stored in the machine-readable storage media. The machine may call an instruction stored in the storage medium, and as a device operable according to the called instruction, may include the cleaning robot according to the embodiments described above.

Based on the above-described command being executed by the processor, the processor may directly or using other elements under the control of the processor perform the function corresponding to the command. The command may include a code generated by the compiler or executed by the interpreter.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. A cleaning robot comprising:
at least one sensor;
at least one camera;
a driver;
at least one memory storing at least one instruction; and
at least one processor circuit connected with the at least one sensor, the at least one camera, the driver, and the at least one memory and configured to execute the at least one instruction,
wherein the at least one instruction, when executed by the at least one processor circuit causes the cleaning robot to:
identify a surrounding environment based on a video captured using the at least one camera, wherein the video is captured while the driver causes the cleaning robot to move,
identify, based on the surrounding environment, whether a driving route is a caution route, and
adjust, based on identifying that the driving route is the caution route, a processing priority order of data obtained from the video to be higher.

2. The cleaning robot of claim 1, wherein the at least one instruction, when executed by the at least one processor circuit, further causes the cleaning robot to:
identify whether the driving route of the cleaning robot is a safe route or the caution route based on whether identifying that an obstacle is present within a preset distance of the cleaning robot.

3. The cleaning robot of claim 2, wherein the at least one instruction, when executed by the at least one processor circuit, further causes the cleaning robot to:
based on the driving route being identified as the safe route, perform video processing by adjusting at least one from among a resolution and a frame rate of the video.

4. The cleaning robot of claim 2, wherein the at least one instruction, when executed by the at least one processor circuit, further causes the cleaning robot to:
based on the driving route being identified as the safe route, stop an operation of the at least one sensor.

5. The cleaning robot of claim 2, wherein the at least one instruction, when executed by the at least one processor circuit, further causes the cleaning robot to:
based on the driving route being identified as the safe route, cause a kernel of the cleaning robot not to receive an output signal of the at least one sensor.

6. The cleaning robot of claim 1, wherein the at least one sensor comprises one from among an infrared (IR) sensor or a fall detection sensor.

7. The cleaning robot of claim 1, wherein the at least one instruction, when executed by the at least one processor circuit, further causes the cleaning robot to:
based on an abnormality being identified in at least one from among the at least one camera, the at least one sensor, or the at least one processor, control the driver to return the cleaning robot to a charging station.

8. The cleaning robot of claim 1, wherein the at least one camera comprises a stereo camera and a RGB camera, and
wherein the at least one instruction, when executed by the at least one processor circuit, further causes the cleaning robot to:
based on an abnormality being identified in the stereo camera or the RGB camera, capture the video using a normally operating camera from among the at least one camera and provide the video to an application configured to use an input received from the camera, among the stereo camera and the RGB camera, identified with the abnormality.

9. The cleaning robot of claim 1,
wherein the at least one instruction, when executed by the at least one processor circuit, further causes the cleaning robot to:
based on an abnormality being identified in one configuration from among the at least one camera and the at least one sensor, provide to an application configured to use data from the one configuration, data from another configuration corresponding to the one configuration.

10. The cleaning robot of claim 9,
wherein the at least one sensor comprises an infrared (IR) sensor,
wherein the at least one instruction, when executed by the at least one processor circuit, further causes the cleaning robot to:
based on an abnormality being identified in the IR sensor, provide, to an application configured to use data from the IR sensor, distance information generated based on the video captured using a normally operating camera from among the at least one camera.

11. The cleaning robot of claim 9,
wherein the at least one sensor comprises a fall detection sensor,
wherein the at least one instruction, when executed by the at least one processor circuit, further causes the cleaning robot to:
based on an abnormality being identified in the fall detection sensor, and determining the cleaning robot not being in a fall situation, provide, to an application configured to use data from the fall detection sensor, a signal value corresponding to the cleaning robot not being in the fall situation based on the video captured using a normally operating camera from among the at least one camera.

12. A cleaning robot comprising:
at least one sensor;
at least one camera;
a driver;
at least one memory storing at least one instruction; and
at least one processor circuit connected with the at least one sensor, the at least one camera, the driver, and the at least one memory and configured to execute the at least one instruction,
wherein the at least one instruction, when executed by the at least one processor circuit, causes the cleaning robot to:
identify a surrounding environment based on a video captured using the at least one camera, wherein the video is captured while the driver causes the cleaning robot to move, and adjust, based on the surrounding environment, a processing priority order of data obtained from the video, wherein the at least one processor circuit comprises a central processing unit (CPU) and a graphics processing unit (GPU), and wherein the at least one instruction, when executed by the at least one processor circuit, further causes the cleaning robot to:

perform video processing of the video by selectively using the CPU or the GPU based on an operating state of the CPU and an operating state of the GPU.

13. The cleaning robot of claim 12, wherein the at least one instruction, when executed by the at least one processor circuit, further causes the cleaning robot to:

identify the CPU or the GPU to perform the video processing based on a processing time of the video processing in the GPU, a processing time of the video processing in the CPU, and an estimated time of completion of a current task in the GPU.

* * * * *